United States Patent [19]

Shankle

[11] 4,429,308
[45] Jan. 31, 1984

[54] ELECTRODE OR POLE PIECE ARRAY FOR CREATING PRESCRIBED ELECTRIC OR MAGNETIC FIELDS

[75] Inventor: Arthur T. Shankle, Raleigh, N.C.

[73] Assignee: Charles J. Cain, Greenville, N.C.

[21] Appl. No.: 728,119

[22] Filed: Sep. 30, 1976

[51] Int. Cl.³ ............... G08C 19/10; G08C 19/00; G08C 19/06
[52] U.S. Cl. ............... 340/870.37; 340/870.02; 340/870.31; 361/297; 361/278
[58] Field of Search ............... 340/177 R, 200, 196, 340/310 A, 870.37, 870.01, 870.32, 870.31, 870.02; 324/61 R, 60 R, 60 C; 361/277, 278, 292, 297, 300, 329; 318/662; 343/731, 732, 763

[56] References Cited

U.S. PATENT DOCUMENTS

| 3,172,023 | 3/1965 | Blasingame. | |
| 3,230,430 | 1/1966 | Barnes | 361/297 |
| 3,668,672 | 6/1972 | Parnell | 340/200 |
| 3,683,402 | 8/1972 | Parnell | 340/200 |
| 3,845,377 | 10/1974 | Shimotori | 340/200 |
| 3,961,318 | 6/1976 | Farrand et al. | 340/200 |
| 4,007,454 | 2/1977 | Cain et al. | 340/200 |

Primary Examiner—James J. Groody
Attorney, Agent, or Firm—Charles R. Rhodes; Judith G. Smith

[57] ABSTRACT

A circular array of equally spaced, interleaved, reference elecrodes or pole pieces are arranged about the center of the array for producing an electric or magnetic field in which the resultant vector representing the maximum field strength rotates as a polyphase current or voltage source is successively applied to successive ones of the electrodes or pole pieces. In a preferred embodiment, each of the electrodes is uniquely and generally crescent shaped such that along any radius from the center of the array passing through a given electrode, the radial width of the electrode varies in proportion to the sine of $A \cdot \theta$ where A is an arbitrary constant and $\theta$ is the azimuthal angle of the radius as measured from the initial end of the electrode. The radial cross-section ratio may be achieved by varying the width alone, varying the elevation alone, or by a combination of the two.

So arranged, the inner and outer edges of each electrode of constant elevation conform substantially to the curves $$r_{outer} = r_{min} + \frac{\theta}{\pi}(r_{max} - r_{min}) + d \sin \theta$$

$$r_{inner} = r_{min} + \frac{\theta}{\pi}(r_{max} - r_{min}) - d \sin \theta$$

where $r_{outer}$ is the radial distance from the center of the array to the outer edge of the electrode at any angle $\theta$ within the arc subtended by the electrode ($0 \leq \theta \leq \pi$);

$r_{inner}$ is the radial distance from the center of the array to the inner edge of the electrode at any angle $\theta$ within the arc subtended by the electrode ($0 \leq \theta \leq \pi$);

$R_{min}$ is the radial distance from the center of the array to both curves at $\theta = 0$;

$r_{max}$ is the radial distance from the center of the array to both curves at $\theta = \pi$;

$\theta$ is the azimuthal angle to a given point, measured in radians;

d is a parameter which determines the maximum width of the electrode.

8 Claims, 9 Drawing Figures

ELECTRODE OR POLE PIECE ARRAY FOR CREATING PRESCRIBED ELECTRIC OR MAGNETIC FIELDS

BACKGROUND OF THE INVENTION

In an earlier U.S. Patent to Charles Cain U.S. Pat. No. 3,500,365, and in another earlier U.S. Pat. No. 4,007,454 to Charles Cain and myself, there are disclosed the use of rotating magnetic and electric fields, respectively, in a device for remotely measuring the orientation of a meter hand or other rotating object. As it turns out, the actual theory of operation is not exactly a rotating electric or magnetic field. Rather, more correctly, the field in the space adjacent the meter hand or other rotating object is such that the resultant vector representing maximum field strength rotates. However, a "rotating electric or magnetic field" is approached or approximated and hence, the terminology is not wrong. As used hereinafter the above theory of operation will then sometimes be referred to as rotating electric or magnetic field. As far as this application is concerned, the magnetic field case is directly analogous to the electric field case and leads to similar results. Therefore, for the most part, the instant application will be directed to a description of the electrode array, and the magnetic pole piece array will become apparent.

In the meter-reading device mentioned hereinabove, there is described a circular array of electrodes arranged in a plane with a detecting electrode located at the center thereof, and coplanar with the array. By application of polyphase voltage to successive electrodes in the circular array, an electric field (maximum field strength vector) is caused to effectively rotate in the adjacent air space. The detecting electrode, which is located at the center of the field's rotation, finds itself in a region of constant field strength. Consequently any measurement of its electrical potential will give a constant value as the field rotates. The array is positioned immediately adjacent and before a meter dial in such position that the detecting electrode confronts the end of the meter shaft and the surrounding electrodes confront the circular path described by the meter hand. As a result, the meter hand is immersed in the rotating field and "samples" the field and, by capacitive coupling, communicates the field strength behavior it there finds to the detecting electrode near its opposite end. The rotating field is such that the meter hand tip experiences a sinusoidal variation of field strength, and thus the detecting electrode likewise displays a sinusoidal variation of electrical potential. The electrical phase of the potential on the detecting electrode is determined by the angular orientation of the meter hand from a referenced point (usually zero), and a comparison of phase between this potential and that applied to any one of the electrodes in the circular array (the "reference" electrode) yields a measurement of the position of the meter hand.

The foregoing is a description of the device which remotely measures the orientation of meter hands or other rotating objects as described in the aforementioned patents, and therefore, it can be seen that it is desirable that the maximum field strength vector rotates uniformly. That is, the maximum field strength vector should have reasonably constant amplitude and rotate at a substantially uniform angular speed (also referred to as being linear). Otherwise the phase difference between the potentials of the detecting and reference electrodes would not be simply proportional to the hand position, but would be greater or less as the amplitude or speed varied. This would cause the device to be less sensitive in some angular regions than other, and unless compensated by field-correction means or by electronic means, could materially reduce the utility of the device. It has been found that the shape disclosed in U.S. Pat. No. 4,007,454 was not altogether satisfactory in this regard, i.e. the field strength vector did not maintain constant amplitude or rotate at uniform angular speed. Further the fact that all meter hands are not needle-like, but sometimes are tapered added to the problems in the embodiment described in earlier U.S. Pat. No. 4,007,454.

SUMMARY OF THE PRESENT INVENTION

It has been found experimentally that the maximum uniformity of angular sensitivity is obtained by shaping the field-producing electrodes, plate member, or intervening medium such that the resultant signal on the meter hand varies sinusoidally with time and the phase of the signal is a linear function of the angular position of the meter hand. Preferably this is accomplished by overlapping or interleaving the electrode in such a manner that the meter hand always overlies a plurality of electrodes and by capacitively coupling the electrodes with the meter hands such that the capacitive ratios of the various electrode areas underlying the meter hand are related to each other in proportion to the sines of the angles of each area, which angles are defined as the angular distance between the hand position at any one time and the angle at which the meter hand first encountered each electrode during a hypothetical rotation to its position at the same time. If the meter hand and adjacent portion of the electrode is considered to form a parallel-plate capacitor, the capacitance will be given by the formula $C = \epsilon(A/S)$, where $\epsilon$ is the dielectric constant (a proportionality constant), A is the active area of the two plates and S is their separation. We can then obtain the desired sinusoidal capacitance pattern by shaping the electrodes in either of two ways: (1) by employing plane electrodes whose radial width varies sinusoidally with angle, or (2) by employing constant-width electrodes whose distance from the meter hand varies inversely with the sine of the angle. The former "flat-electrode" configuration is the more advantageous for most applications, since it is simpler to manufacture and minimizes the thickness in size of the device. It should be pointed out here that electrode shape is but one approach to achieving the desired sinusoidal capacitance variation. Other approaches, such as by varying the dielectric material in the same ratios or other characteristics which would tend to vary the capacitance are also possible.

The present invention then is directed to the shape and arrangement of electrodes to better provide such a uniformly rotating maximum field strength vector as is desirable for the referenced meter-reading devices. In one embodiment for the electric field arrangement, in which the electrode array is excited by three-phase voltage, six identically shaped electrodes are used in a circular array. Each electrode is crescent shaped and subtends an angle of $\pi$ radians and has a radial width which varies as the sine of the angle between 0 and $\pi$. It should be noted that if the electrode subtends an arch of $2\pi$ radius or $\frac{1}{2}\pi$ radius, the width would vary accordingly, i.e. as the sine of $2\theta$ or $\frac{1}{2}\theta$, the constant being the multiplier of $\pi$ which identifies the angle subtended by the electrode. The electrodes are interleaved with each other by arranging their center lines along equally-spaced spirals or curves such that one end of each electrode lies at a given inner radius and the other end ($\pi$ radians away) at a larger outer radius. Such interleaving allows electrical connections to be made at the outer radius ends of the electrodes. The sensing electrode is circular.

The equations of the edges of such electrodes are:

$$r = r_{min} + \frac{\theta}{\pi}(r_{max} - r_{min}) + d \sin \theta \text{ (the outer edge)}$$

$$r = r_{min} + \frac{\theta}{\pi}(r_{max} - r_{min}) - d \sin \theta \text{ (the inner edge)}$$

where $r_{min}$ = the radius of both curves at $\theta = 0$
$r_{max}$ = the radius of both curves at $\theta = \pi$
$\theta$ = the angle in radians
$d$ = a parameter which determines the maximum radial width of the electrode.

In the above equations, the first two terms provide a spiral center line for each electrode and the last term causes a sinusoidal deviation from that center line. The radial dimension of the electrode at any particular angle is $R = 2d \sin \theta$.

Because of the interleaving or overlapping, along any radius the meter hand overlies a plurality of electrodes. By application then of electromagnetic theory, the desired shape of the electrode provides a capacitive coupling in which the capacitive ratios of the electrode areas underlying the hand are each related to the others in proportion to the sines of A·$\theta$. A is an arbitrary constant and the angle $\theta$ is defined as the angular distance between the hand position and the azimuthal angle at which the plate member first encounters the electrode during a hypothetical rotation.

In an alternative embodiment, which is somewhat more cumbersome, the "convex-electrode" configuration may be achieved in which the electrode width is constant, but the electrode surface rises out of the plane of the array. With this approach the dimension of the device in the direction perpendicular to the electrode array must be large enough that the portion of each electrode which is furthest from the meter hand contributes negligible coupling to the meter hand, i.e., can be considered infinitely distant from the hand, a condition imposed by the requirement that the meter hand to electrode distance vary as $1/\sin \theta$, a function which is not defined for all values of angle $\theta$ (i.e. $\theta = 0$ and $\theta = \pi$ radians).

Clearly the two approaches described above are not mutually exclusive, and electrodes can be constructed having various combinations of radial-width shaping and of surface height shaping which will satisfy the basic condition of this invention: i.e., that each field-producing electrode be so shaped that at any azimuthal angle $\theta$ the ratio of its radial width to its surface elevation be proportional to the sine of the angle $\theta$. Further construction of the layer of intervening material, such that its permittivity (dielectric constant) varies sinusoidally with the azimuthal angle $\theta$ and/or combinations with shaping of the electrodes will accomplish the same result. As defined herein the azimuthal angle or the angle $\theta$ is the angle subtended between the initial end or at $r_{min}$ of the electrode or pole piece and the point along the electrode or pole piece being defined.

It is therefore an object of the present invention to provide a capacitive configuration of electrodes (or inductive configuration of pole pieces in the magnetic arrangement) that will create a uniformly rotating maximum field strength vector when the electrodes thereof are connected to a polyphase voltage source.

It is further an object of the present invention to provide an electrode shape of the type described which causes the resultant field strength signal on the adjacent meter hand to vary substantially sinusoidally with time and the phase angle of the signal to vary as a linear function of the angular position of the meter hand.

It is another object of the present invention to provide an electrode shape of the type described in which the resultant signal is caused to vary sinusoidally by employing plane electrodes whose radial width varies substantially sinusoidally with the azimuthal angle of the adjacent meter hand.

Another object of the present invention is to provide an alternate electrode shape which is constant in width but whose surface distance from the meter hand varies substantially inversely with the sine of the angle.

A further object of the present invention is to duplicate the above stated objectives with the magnetic analogue of the electric field version.

Other objects and a fuller understanding of the invention will be obtained from reading the following detailed description of the preferred embodiment along with the accompanying drawings in which.

DETAILED DESCRIPTION OF THE PREFERRED EMBODIMENT

Figures 1, 2:
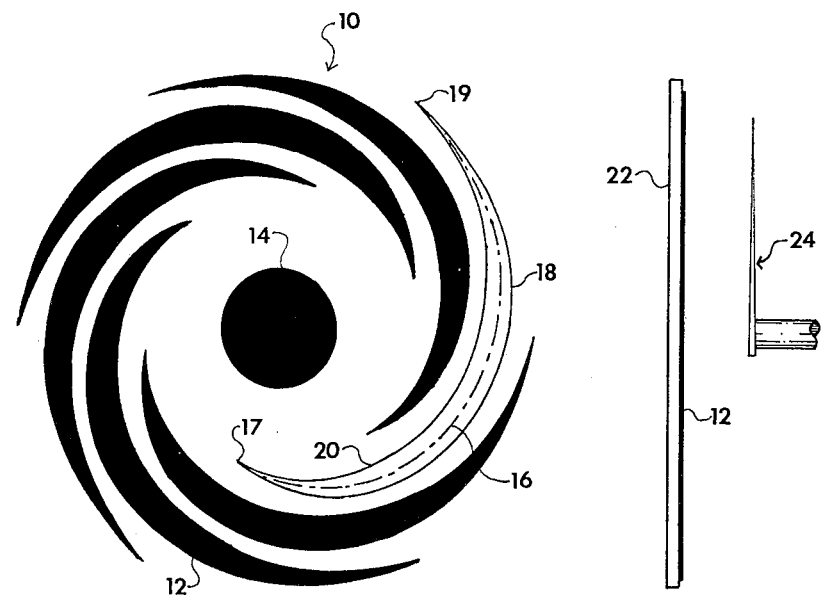
FIG. 1 is a plan view of the electrode array according to a preferred embodiment of the present invention.
FIG. 2 is a side view of the electrode array illustrated in FIG. 1 as presented adjacent a meter hand.

Turning now to the drawings, particularly to FIGS. 1 and 2, there is illustrated the preferred electrode array 10 in which six identically shaped electrodes 12 are arranged on a supporting plate 22 in a circular array around a central, circular sensing electrode 14. The array is, in use, positioned in confronting relationship to the meter hand 24 to be monitored. Each of the reference electrodes is crescent shaped and subtends an angle of $\pi$ radians. Further, the electrodes 12 are interleaved with each other. This is accomplished by arranging the center lines 16 of the electrodes along equally spaced, spiral or otherwise curved paths, such that one end 17 of each electrode lies at a given radius and the other end 19 ($\pi$ radians away) lies at a larger outer radius. The interleaving, while not critical, is highly desirable and allows proper spacing and shaping of the electrodes, and permits the electrical connections to be made at the outer radial ends 19 of the electrodes.

While the center line 16 of electrode lies along a spiral path and extends throughout an arc of 180°, the outer and inner edges 18,20, respectively, of each electrode vary in distance from the center line 16 according to the sine of the angle $\theta$ as it varies between zero and $\pi$. In other words, it can be assumed that the angle $\theta$ is zero at the inner end 17 of each electrode and $\pi$ at the outer end 19. Along the path therebetween, the outer and inner edges 18,20 of the electrodes varies as the sine of $\theta$ varies between zero and $\pi$.

To plot the actual equations of the edges of each electrode, the following equations are used:

$$r = r_{min} + \frac{\theta}{\pi}(r_{max} - r_{min}) + d \sin \theta \text{ (the outer edge)}$$

$$r = r_{min} + \frac{\theta}{\pi}(r_{max} - r_{min}) - d \sin \theta \text{ (the inner edge)}$$

where $r_{min}$ = the radius of both curves at $\theta = 0$
$r_{max}$ = the radius of both curves at $\theta = \pi$
$\theta$ = the angle in radians
d = a parameter which determines the maximum radial width of the electrode.

In the above equations, the first two terms provide the plot for spiral center line 16, and the last term plots the deviation from that center line.

Figures 3, 3A, 3B:
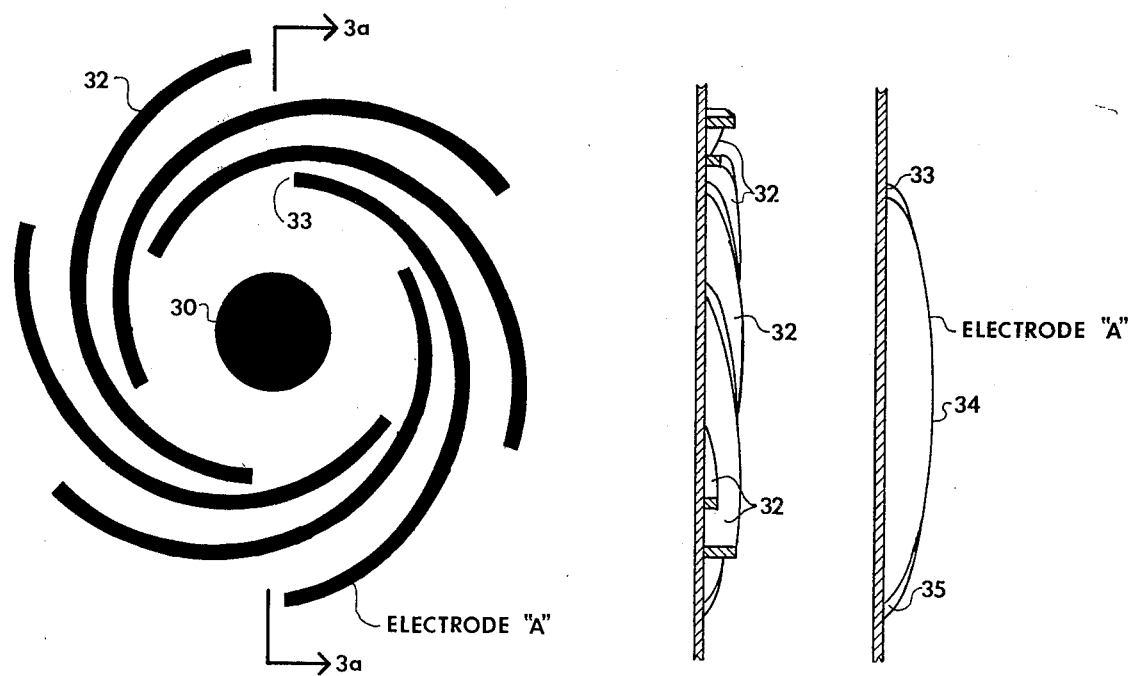
FIG. 3 is a plan view of the electrode array according to an alternate embodiment of the present invention.
FIG. 3a is a sectional view taken substantially along lines 3a—3a in FIG. 3.
FIG. 3b is a sectional view similar to FIG. 3a except illustrating the configuration of a single electrode "A"

While in the preferred embodiment above, the electrodes 12 are planar with only the width varying, in an alternate embodiment illustrated in FIGS. 3, 3a, 3b, the configuration is shown in which the width of electrodes 32 is constant, while the surface of the electrode rises out of the plane of the array to approach or come closer to the meter hand or other rotating member being monitored. Note that again the sensing electrode 30 is circular and planar, while the reference electrodes 32 are again crescent shaped. The electrodes 32, while being of constant width, start at the inner end 33 and rise to a peak 34, then return back into the plane of the member upon which the electrodes are placed at 35. This variance is again in accordance with the sine of $\theta$ as it varies between zero and $\pi$, so that the condition imposed as far as the relationship between the surface of electrode 34 and the rotating member are concerned is that the distance from the meter hand to the electrode varies substantially as the function $1/\sin \theta$, as described hereinabove.

Figure 4:
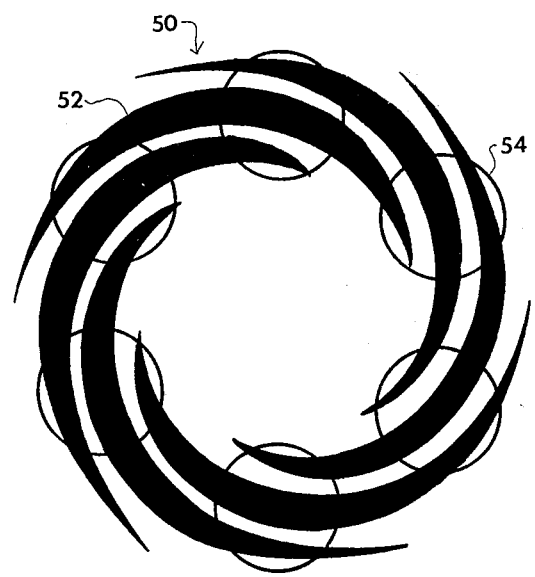
FIG. 4 is a plan view of the pole piece array for the magnetic field version of the present invention.
Figure 4A:
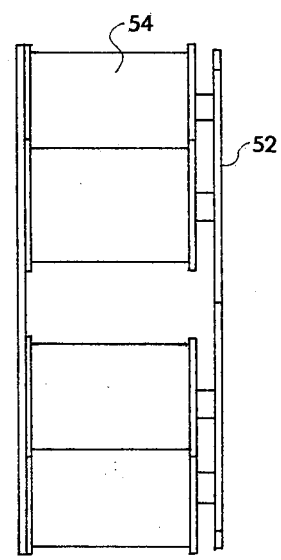
FIG. 4a is a side view of the pole piece array of FIG. 4.
Figure 5:
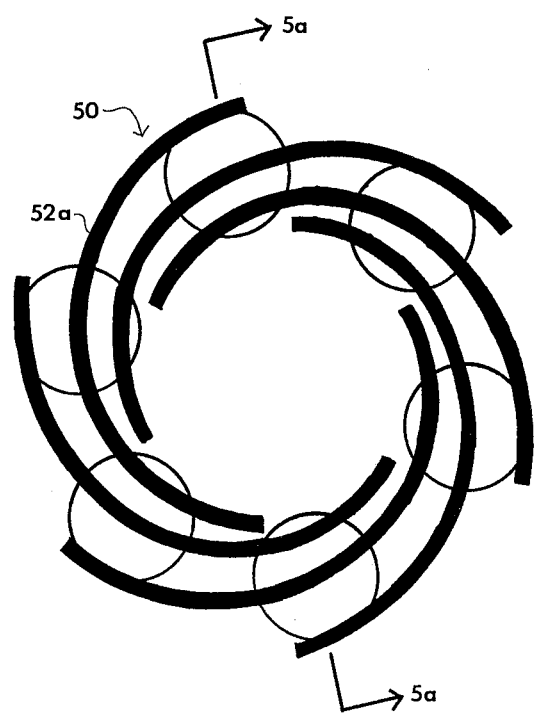
FIG. 5 is a plan view of the pole piece array according to an alternate embodiment.
Figure 5A:
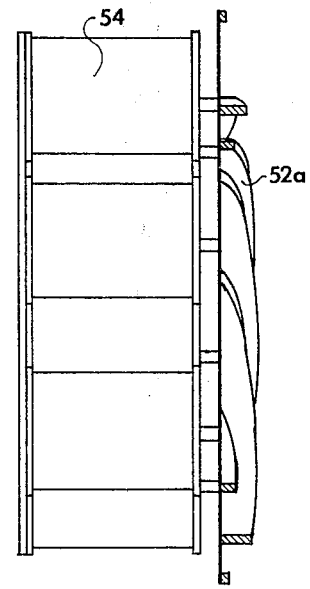
FIG. 5a is a sectional view taken substantially along lines 5a—5a in FIG. 5.

While the electrode embodiments have been illustrated in FIGS. 1 and 3, it is apparent that in the magnetic field arrangement described hereinbove and as illustrated in FIGS. 4 and 5, the pole pieces 52,52a could be arranged on coils 54 in an array 50, similarly to the electrode array described hereinabove with the result that the magnetic field strength vector would rotate more uniformly with more constant amplitude in the same manner.

Further, while changes in shape have been described hereinabove, it is also possible to achieve the capacitive or inductive coupling necessary by varying the materials, or other characteristics of the electrodes, pole pieces, or intervening dielectric or magnetic materials sinusoidally to achieve the uniformly rotating electric or magnetic field, and such other arrangements are considered to be within the scope of the present invention.

Finally, it should be here mentioned that combinations of arrangements illustrated in FIGS. 1 and 3 could be worked out, so that the width of the electrodes could vary as well as the height or distance from the meter hand. The only condition to be attached to such an arangement would be that the field-producing electrode or pole piece should be so shaped that at any azimuthal angle $\theta$, the capacitive ratios of the electrode areas underlying the meter hand are each related to the others in proportion to the sines of $A\cdot\theta$ for each electrode area where A is an arbitrary constant dependant on the angular width that the electrode subtends and in which the angle $\theta$ is defined as the angular distance between the meter hand position and the azimuthal angle at which the hand first encounters each electrode during a hypothetical rotation to the hand position.

It is to be understood that while specific embodiments have been described in detail hereinabove, various other changes and modifications could be made without departing from the scope of the present invention which is defined by the following claims.

What is claimed is:

1. An improved electrode arrangement comprising a circular array of discrete, arcuately shaped, spaced electrodes lying substantially in a plane and interleaved with each other in such a manner that any given radius from the center of the array will intersect a plurality of said electrodes, said electrodes further connected to a polyphase voltage for producing an electric field in space adjacent to the plane of the array in which the resultant vector representing the maximum field strength rotates, a radially extending, symmetrical plate member positioned in said electric field and revolving in a given reference plane parallel to the plane of said array, said electric field producing a resultant signal on said plate member which varies substantially sinusoidally with time, and the phase of said resultant signal with respect to any one of the drives of the polyphase voltage being a substantially linear function of the angular position of said plate member when said electrodes are connected to said polyphase voltage.

2. The electrode arrangement according to claim 1 wherein said plate member overlies a plurality of electrodes and is capacitively coupled thereto.

3. The electrode arrangement according to claim 2 and further in which the capacitive ratios of the electrode areas underlying said plate member are each related to the others in proportion to the sines of the angles of each electrode area, which angles are defined as the angular distance between the plate member position and the angle at which the plate member first encounters each electrode during a hypothetical rotation to said plate member position.

4. The electrode arrangement in accordance with claim 3 wherein the upper surfaces of said electrodes lie entirely in a plane parallel to the plane of the electrode array such that the surface height of all points on a given electrode is constant and the width of each electrode along a given radius from the center of the array is proportional to the sine of $A\cdot\theta$ where A is an arbitrary constant and $\theta$ is the angular position between the plate member and the azimuthal angle at which the plate member first encounters the electrode during a hypothetical rotation.

5. The electrode arrangement in accordance with claim 4 wherein the angle subtended at the center of the array by each of said electrodes is $\pi$ radians.

6. The electrode arrangement in accordance with claim 5 within the edges of each electrode conform substantially to the curves described by:

$$r_{outer} = r_{min} + \frac{\theta}{\pi}(r_{max} - r_{min}) + d \sin\theta$$

$$r_{inner} = r_{min} + \frac{\theta}{\pi}(r_{max} - r_{min}) - d \sin\theta$$

where $r_{outer}$ is the radial distance from the center of the array to the outer edge of the electrode at any angle $\theta$ within the arc subtended by the electrode ($0 \leq \theta \leq \pi$)

$r_{inner}$ is the radial distance from the center of the array to the inner edge of the electrode at any angle $\theta$ within the arc subtended by the electrode ($0 \leq \theta \leq \pi$)

$r_{min}$ is the radial distance from the center of the array to both curves at $\theta = 0$ $r_{max}$ is the radial distance from the center of the array to both curves at $\theta = \pi$ $\theta$ is the azimuthal angle to a given point measured in radians d is a parameter which determines the maximum width of the electrode.

7. The electrode arrangement in accordance with claim 3 wherein for any radius passing through a given electrode the radial width of the electrode is constant and the surface height of the electrode is proportional to the sine of $A \cdot \theta$ where A is an arbitrary constant and $\theta$ is the angular position between the plate member position and the azimuthal angle at which the plate member first encounters the electrode during a hypothetical rotation.

8. The electrode arrangement according to claim 1 wherein the surfaces of each of said electrodes are coplanar; wherein for any radius passing through a given electrode the radial width of the electrode is constant; and wherein the dielectric constant of said intervening medium along each electrode is proportional to the sine of $A \cdot \theta$ where A is an arbitrary constant and $\theta$ is the azimuthal angle of said radius as measured from the tip of said electrode.

* * * * *